Oct. 6, 1964     E. G. HASTINGS, JR     3,151,609

CHARCOAL COOKER

Filed Oct. 5, 1962

INVENTOR.
EARLE GRANT HASTINGS, JR

BY *Head & Johnson*

ATTORNEYS

United States Patent Office 3,151,609
Patented Oct. 6, 1964

3,151,609
CHARCOAL COOKER
Earle Grant Hastings, Jr., 4444 Oak Road, Tulsa, Okla.
Filed Oct. 5, 1962, Ser. No. 228,555
3 Claims. (Cl. 126—25)

This invention relates to a charcoal cooker. More particularly, the invention relates to an improved firebox supporting and positioning means for a charcoal cooker.

In charcoal cooking there are two primary means of controlling the effect of the heat on the food being cooked. First, the oxygen to the fire may be controlled, limiting the combustion rate, but such a method of control is not immediately responsive. When the rate of air going to the charcoal is altered, a length of time elapses before the intensity of the heat applied to food is materially increased or decreased. The second method of controlling the heat on the food is by varying the distance between the food being cooked and the burning charcoal. Most of the better charcoal cookers presently commercially available provide means of varying the distance between the grill and the firebox, either by varying the height of the grill or by vertically positioning the firebox.

It is therefore an object of this invention to provide an improved firebox lift mechanism for a charcoal cooker.

More particularly, it is an object of this invention to provide an improved firebox lift mechanism for a charcoal cooker which is extremely simple and inexpensive to construct and which is substantially fail-proof in operation.

Another object of this invention is to provide a firebox for a charcoal cooker which is easily removable from the cooker for cleaning and so forth.

These and other objects and a better understanding of the invention may be had by referring to the following description and claims taken in conjunction with the attached drawings in which:

This invention relates to an improved means of supporting and positioning the firebox in a charcoal cooker. More particularly, but not by way of limitation, the invention may be described as a charcoal cooker having a metal frame and a firebox vertically movably supported therein on a cantilevered lift mechanism, a means of adjustably positioning said firebox in said frame comprising, a chain affixed at one end to said lift mechanism, and means of detachably supporting said chain at various positions along its length to said frame.

Figure 1:
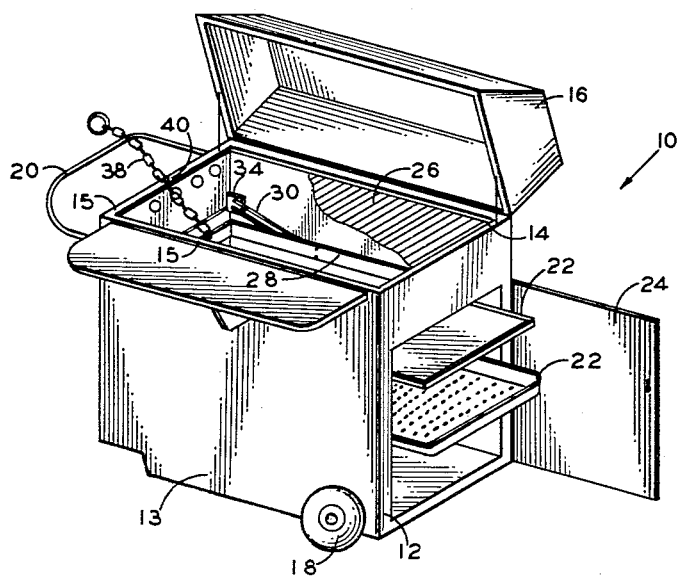
FIGURE 1 is an isometric external view of a typical outdoor cooker utilizing the firebox lift mechanism of this invention.

Referring now to the drawings and first to FIGURE 1, a charcoal cooker is generally indicated by the numeral 10. The cooker 10 is provided with a base portion or frame 12 which is typically of a rectangular box shape construction having vertical sides 13 and an open top 14. The vertical sides 13 terminate with an integral horizontally extending flange portion 15. The open top 14 is closed by a hinged cover 16. The cooker 10 may be provided with wheels 18 and a handle 20 so that it may be easily moved about.

In order to provide access to the interior of the cooker 10, one end of the frame 12 is open so that trays 22 may be slid in and out. The open end is provided with a door 24.

There are two primary ways that food is prepared on a charcoal cooker. One is the use of a grate 26 which supports the food and at the same time exposes it to a source of heat from below. The second primary way of cooking with charcoal is the use of a rotary spit (not shown) supported above the charcoal. Whether a spit or a grate 26 is utilized, good cooking requires that the intensity of heat applied to the food be quickly variable.

Figure 2:
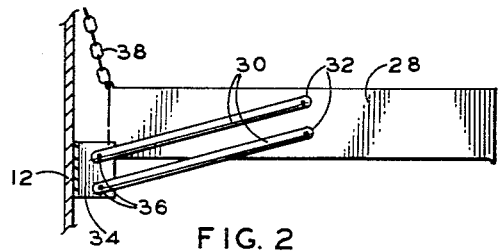
FIGURE 2 is a partial cutaway view showing the means whereby the firebox mechanism is supported in the cooker.

To support the charcoals or other fuel utilized for cooking, a firebox 28 is supported within the frame 12 below grate 26. Firebox 28 can be vertically movably supported in a variety of ways which permits it to be raised and lowered, but the preferred method of supporting the firebox is shown in FIGURE 2. The firebox 28, which may be a rectangular shallow open top metal box, which is cantilevered to frame 12 by two parallel bars 30 which are pivoted to the firebox 28 at pivot points 32 and are pivotally supported at the opposite ends to a bracket 34 at pivot points 36. The arrangement of FIGURE 2 maintains firebox 28 always level but permits it to be raised and lowered.

Figure 4:
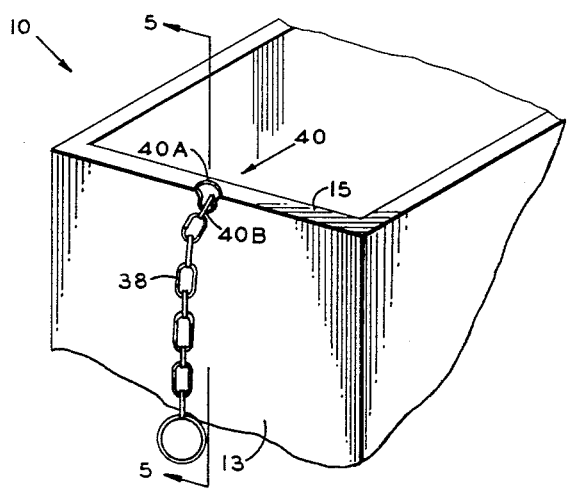
FIGURE 4 is an enlarged end view of a portion of a charcoal cooker showing the means whereby the lift chain is held in a pre-selected position.

One of the problems overcome by this invention is the provision of means of maintaining firebox 28 in a pre-selected position. This is accomplished in this invention by the use of a chain 38. The chain 38 is hooked to the center of one end of the firebox 28, the end being preferably the end adjacent brackets 34. The chain 38 extends through an opening 40 which is formed partially in the vertical side 13 of frame 12 and partially in the adjoining horizontal flange portion 15. The configuration of opening 40 is best shown in FIGURE 4. Opening 40 is formed in the center of one end of frame 12 at the juncture of a vertical side 13 and the horizontal flange portion 15. Opening 40 may be said to consist of two portions, a larger portion 40A formed in the horizontal flange 15 and a smaller elongated slot shaped portion 40B formed in the vertical side 13.

Figure 5:
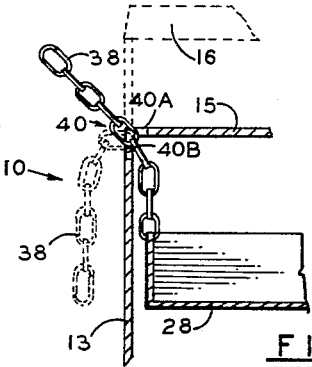
FIGURE 5 is a partial cross-sectional view taken along the line 5—5 of FIGURE 4 showing in greater detail the construction and operation of the firebox lift mechanism of the invention.

The way in which chain 38 is utilized to adjustably vary the height of firebox 28 is best shown in FIGURE 5. The chain 38 has one end affixed to firebox 28 or the lift mechanism 42 and extends through opening 40 to the outside of the charcoal cooker 10. When it is desired to raise firebox 28, the chain is pulled straight upward so that the chain extends through the larger horizontal portion 40A of opening 40 formed in the flange portion 15. The larger portion 40A of opening 40 permits the chain 38 to be easily pulled therethrough and provides ample clearance around chain 38 so that the chain can be easily pulled upwardly, lifting the firebox 28. When the firebox 28 is pulled upwardly to its desired position, the user pulls the chain downwardly so that one link of the chain 38 fits within the slot shaped vertical portion 40B of opening 40. Chain 38 is typically made up of a sequence of links, so that when the chain is pulled into the slot shaped portion 40B of opening 40 one of the links engages the narrow opening. This prohibits the chain from being pulled into the opening 40, thus retaining the firebox 28 in its pre-selected position.

When it is desired to lower the firebox, the exposed end of the chain extending outside the frame 12 is lifted, pulling the chain out of the narrow slot 40B so that it extends only through the larger horizontal portion 40A of opening 40, permitting it to be lowered as the firebox 28 is lowered to the desired position.

The unique arrangement of the opening 40 at the juncture of the horizontal flange 15 and vertical side panel 13 presents a very effective means of permitting the chain 38 to be easily lowered and raised to raise and lower the firebox 28, and at the same time quickly and easily secured in proper position by positioning the chain in the slot shaped portion 40B of the opening 40. In this arrangement the weight of the firebox maintains the chain in the slot shaped portion 40B of opening 40 so that it cannot be accidently dislodged. In addition, when the cover 16 is closed, chain 38 is inextricably held in the narrow slot portion 40B of opening 40. This prevents the chain 38 from being accidently dislodged when the cover 16 is closed and assures that the height of the firebox can be adjusted only when the cover is open and the position of the firebox readily visibly discernible.

Figure 3:
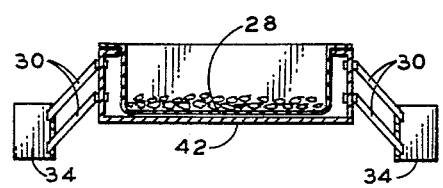
FIGURE 3 is an end view of the firebox support mechanism of this invention.

Firebox 28 may be a simple, open top, rectangular shaped enclosure in which charcoal or other fuels is positioned for cooking. A preferred embodiment, however, is the provision of a removable firebox 28 as shown in FIGURE 3. In this arrangement the firebox 28 is supported by a firebox support and lift mechanism member 42 which is in turn held in varying elevations by bars 30. The firebox support 42 may be an open top, rectangular enclosure having one end thereof opened so that the firebox 28 may be slipped easily out of the support when it is necessary to empty it or add additional charcoal. The provision of the removable firebox 28 of FIGURE 3 provides a means whereby the cooker 10 is more serviceable, being easier to empty expended fuel ashes and to add additional fuel as required.

This invention provides a means of lowering and raising a firebox to obtain more cooking control in a charcoal cooker in a very simple, inexpensive and yet completely safe and fool-proof manner. In addition, the invention provides an improved firebox support arrangement so that the firebox may be easily removed from the cooker for emptying or adding additional fuel.

Although this invention has been described in a degree of particularity, it is manifested that many modifications in the details of construction and the arrangement of components may be made without departing from the spirit and scope of this invention.

I claim:
1. A charcoal cooker comprising the combination of a metal enclosing rectangular frame open at its top with a horizontal support ledge to receive a grill;
a hood hingeably attached along one edge to cover said top when at rest on said horizontal support ledge;
a first vertical side wall of said frame having a closurable opening;
a firebox raising and lowering mechanism comprising:
  (a) bracket means attached to the interior of a second vertical side wall of said frame located opposite said first side wall
  (b) a support frame for a firebox, which permits said firebox to be removed through said closurable opening,
  (c) two pairs of vertically parallel support bars pivotally cantilevered from said bracket to said support frame whereby said support frame can be moved in a vertical direction with respect to said grill;
a link chain lift member, one end of which is attached to said support frame and extends outward of said cooker through an opening at a top corner defined by said second vertical side wall and said horizontal ledge, said opening defined by a slot portion in said second vertical side wall communicating with a larger opening in said horizontal ledge whereby said chain may vertically pass through said larger opening to move said support frame when said hood is open and whereby a single link of said chain may be locked in said slot to hold said support frame at a desired position and yet permit said hood to close with respect to said support ledge.

2. A charcoal cooker comprising the combination of, rectangular frame open at its top with a horizontal support ledge to receive a grill;
a hood hingeably attached along one edge to cover said top when at rest on said horizontal support edge;
a first vertical side wall of said frame having a closurable opening;
a firebox raising and lowering mechanism comprising:
  (a) a support frame for a firebox which permits said firebox to be removed through said closurable opening,
  (b) two pairs of vertically parallel support bars respectively pivotably attached at their one ends to parallel sides of said support frame and extending toward a second vertical side wall of said frame located opposite said first side wall,
  (c) means to pivotably attach the other ends of said bars to said frame whereby said support frame is cantilevered to move in a vertical direction with respect to said grill;
a link chain lift member, one end of which is attached to said support frame and extends outward of said cooker through an opening at a top corner defined by said second vertical side wall and said horizontal ledge, said opening defined by a slot portion in said second vertical side wall communicating with a larger opening in said horizontal ledge whereby said chain may vertically pass through said larger opening to move said support frame when said hood is open and whereby a single link of said chain may be locked in said slot to hold said support frame at a desired position and yet permit said hood to close with respect to said support ledge.

3. A charcoal cooker comprising the combination of a vertical side wall frame open at its top with a horizontal support ledge to receive a grill;
a hood to close said top
a fire box raising and lowering mechanism comprising;
  (a) a fire box,
  (b) two pairs of vertically parallel support bars respectively pivotably attached at their one ends to parallel sides of said fire box and at the opposite ends pivotably attached to said side wall frame whereby said fire box is cantilevered to move in a vertical direction with respect to said grill;
a link chain lift member, one end of which is attached to said fire box and extends outward of said cooker through an opening at a top corner defined by said vertical side wall and said horizontal support ledge, said opening being defined by a slot portion in said vertical side wall communicating with a larger opening in said horizontal ledge whereby said chain may vertically pass through said larger opening to move said fire box and whereby a single link of said chain may be locked in said slot to hold said fire box at a desired position and yet permit said hood to close said top.

References Cited in the file of this patent
UNITED STATES PATENTS

| | | |
|---|---|---|
| 2,334,847 | Spiers | Nov. 23, 1943 |
| 2,473,569 | Cast | June 21, 1949 |
| 3,016,817 | Persinger et al. | Jan. 16, 1962 |
| 3,018,771 | Curtis | Jan. 30, 1962 |

FOREIGN PATENTS

| | | |
|---|---|---|
| 1,117,841 | Germany | Nov. 23, 1961 |